United States Patent [19]
Hall et al.

[11] Patent Number: 4,995,636
[45] Date of Patent: Feb. 26, 1991

[54] TRAILING ARM MODULAR AXLE SUSPENSION UNIT

[75] Inventors: Ron E. Hall, Elkhart, Ind.; David E. Heitzmann, Union, Mich.

[73] Assignee: MOR/ryde, Inc., Elkhart, Ind.

[21] Appl. No.: 358,006

[22] Filed: May 26, 1989

[51] Int. Cl.⁵ .................................................. B60G 11/62
[52] U.S. Cl. .................................. 180/716; 280/688; 267/292; 267/141
[58] Field of Search .............. 280/716, 725, 713, 691, 280/692, 688, 678, 715; 267/219, 141, 152, 292

[56] References Cited

U.S. PATENT DOCUMENTS

| | | | |
|---|---|---|---|
| 3,069,149 | 12/1962 | Neff | 280/715 |
| 3,120,952 | 2/1964 | Hendrickson | 280/716 |
| 3,547,215 | 12/1970 | Bird | 280/713 |
| 3,994,512 | 11/1976 | Parker et al. | 267/292 |
| 4,213,633 | 7/1980 | Moore | 280/716 |

OTHER PUBLICATIONS

Publ. "Hexagonal Rubber Suspension Axles by Al-Ko Kober" Kober Corp., Elkhart, Indiana, Three Pages.
Publ. "Ridewell Presents the Most Advanced Trailing Axle Air Ride Suspension" Ridewell Corp., Springfield, MO., Three Pages.
Publ. "Air Suspensions" Dyneer, Granning Div., Livonia, Michigan, Four Pages.

Primary Examiner—Charles A. Marmor
Assistant Examiner—Karin Tyson
Attorney, Agent, or Firm—Joseph P. Gastel

[57] ABSTRACT

A trailng arm modular axle suspension unit including a hanger for attachment to a vehicle frame and having spaced sides and fore and aft and central portions, a trailing arm having sides and fore and aft and central portions, a rubber bushing mounting the fore portion of the trailing arm on the fore portion of the hanger, the aft portion of the trailing arm extending beyond the central portion of the hanger, a U-bolt construction for mounting an axle on the aft portion of the trailing arm which extends beyond the central portion of the hanger, a shock absorber mounted between the aft portion of the trailing arm and the aft portion of the hanger, and rubber springs secured between the opposite sides of the central portion of the trailing arm and the opposite sides of the central portion of the hanger.

19 Claims, 3 Drawing Sheets

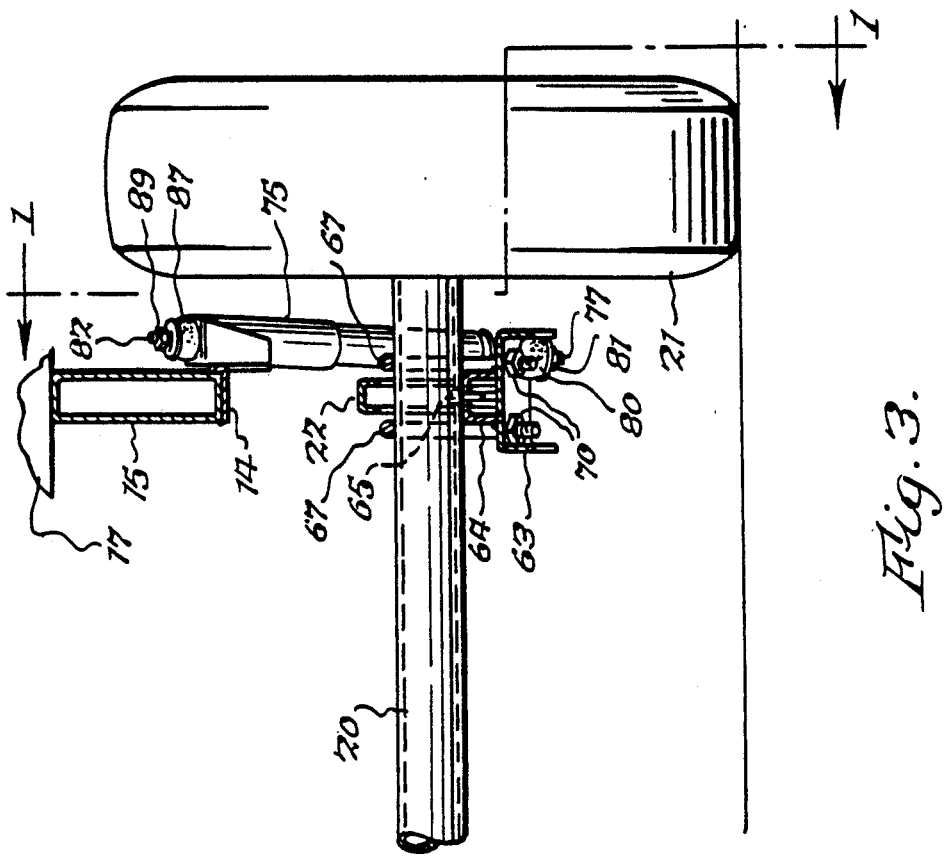
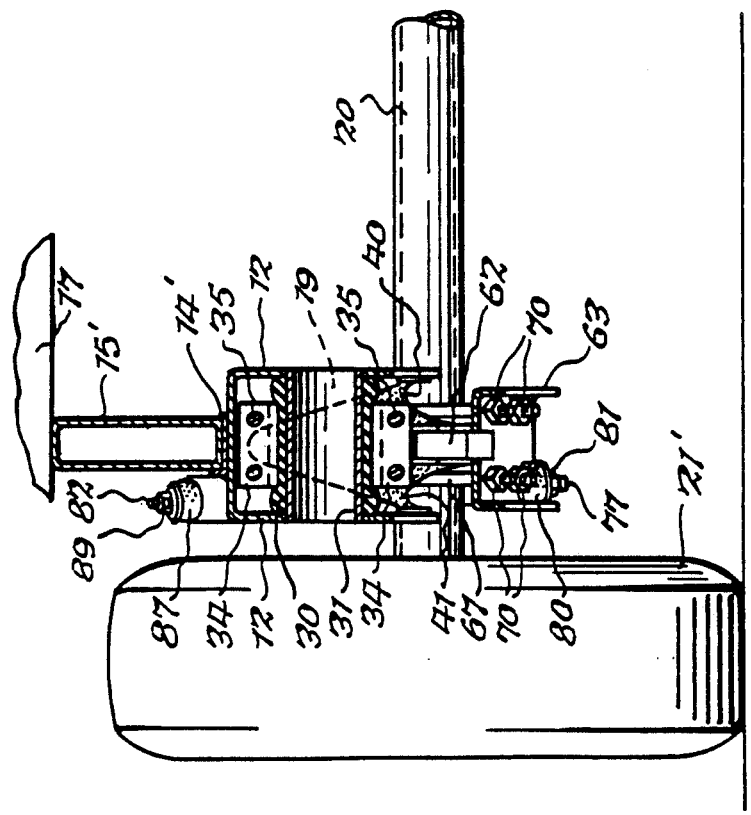
Fig. 3.
Fig. 2.

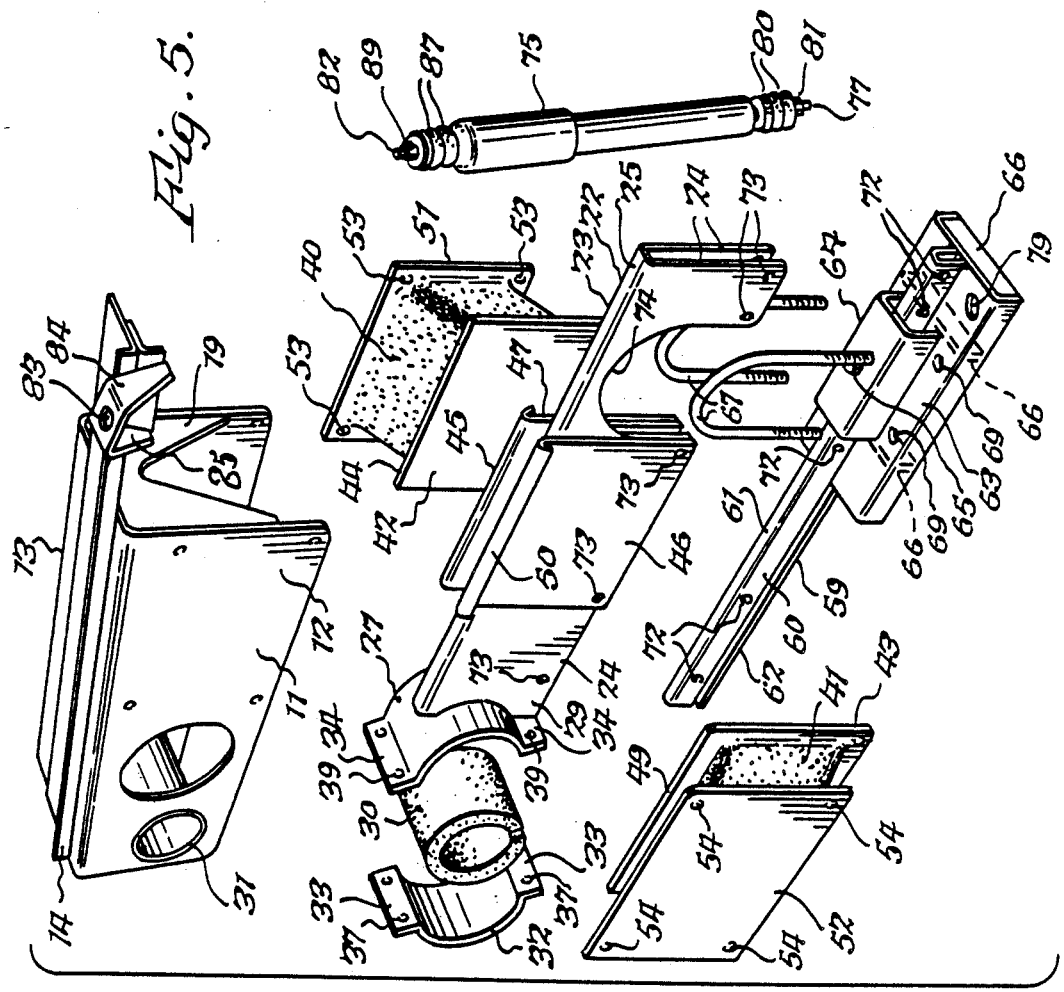
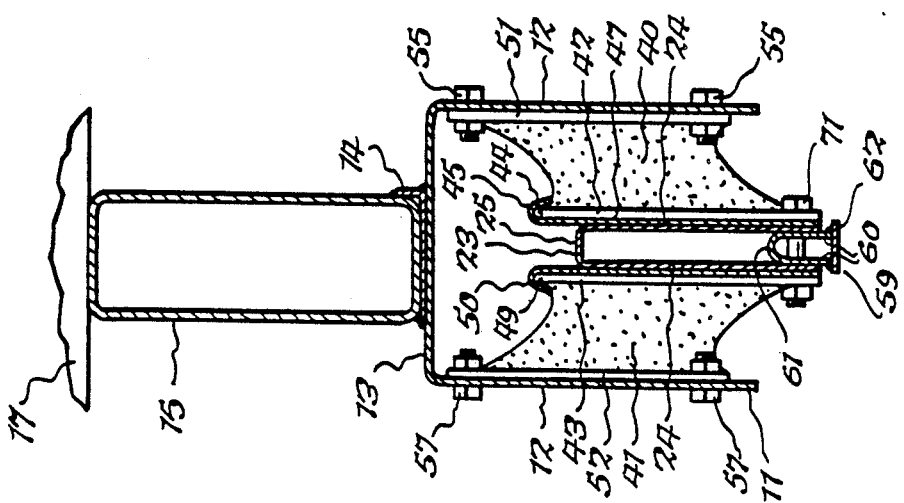

TRAILING ARM MODULAR AXLE SUSPENSION UNIT

BACKGROUND OF THE INVENTION

The present invention relates to a trailing arm modular axle suspension unit for a towed vehicle such as a trailer.

SUMMARY OF THE INVENTION

It is one object of the present invention to provide a trailing arm modular axle suspension unit which can be used in different numbers of pairs to support the opposite ends of different numbers of axles on a towed vehicle.

Another object of the present invention is to provide a trailing arm modular axle suspension unit which can on different frame configurations and which can match longitudinal axle centers utilized on standard multi-axle vehicles.

A further object of the present invention is to provide a trailing arm modular axle suspension unit utilizing rubber springs which are friction-free, which need no lubrication, which provide superior vibration damping characteristics, and which provide a linear spring rate.

A still further object of the present invention is to provide a trailing arm modular axle suspension which resists lateral and longitudinal axle movement without the use of control arms or track bars. Other objects and attendant advantages of the present invention will readily be perceived hereafter.

The present invention relates to a trailing arm modular axle suspension unit comprising a hanger for attachment to a vehicle frame, fore and aft and central portions on said hanger, a trailing arm, fore and aft and central portions on said trailing arm, means for pivotally mounting said fore portion of said trailing arm on said fore portion of said hanger, means for mounting an axle on said aft portion of said trailing arm, shock absorber means between said aft portion of said trailing arm and said aft portion of said hanger, and spring means between said central portion of said hanger and said central portion of said trailing arm.

The various aspects of the present invention will be more fully understood when the following portions of the specification are read in conjunction with the accompanying drawings wherein:

BRIEF DESCRIPTION OF THE DRAWINGS

FIG. 2 is a fragmentary cross sectional view taken substantially along line 2—2 of FIG. 1 and showing the pivotal mounting between the fore portion of the hanger and the fore portion of the trailing arm of a modular suspension unit mounted on the far side of the frame of the vehicle in FIG. 1;

FIG. 3 is a fragmentary cross sectional view taken substantially along line 3—3 of FIG. 1 and showing the connection between the axle and trailing arm and also showing the shock absorber connection between the hanger and the trailing arm on the near side of the vehicle in FIG. 1;

FIG. 4 is a cross sectional view taken substantially along line 4—4 of FIG. 1 and showing the rubber springs between the sides of the hanger and the sides of the trailing arm on the near side of the vehicle of FIG. 1; and FIG. 5 is an exploded perspective view of the various parts of a trailing arm modular axle suspension unit.

DESCRIPTION OF THE PREFERRED EMBODIMENTS

Figure 1:
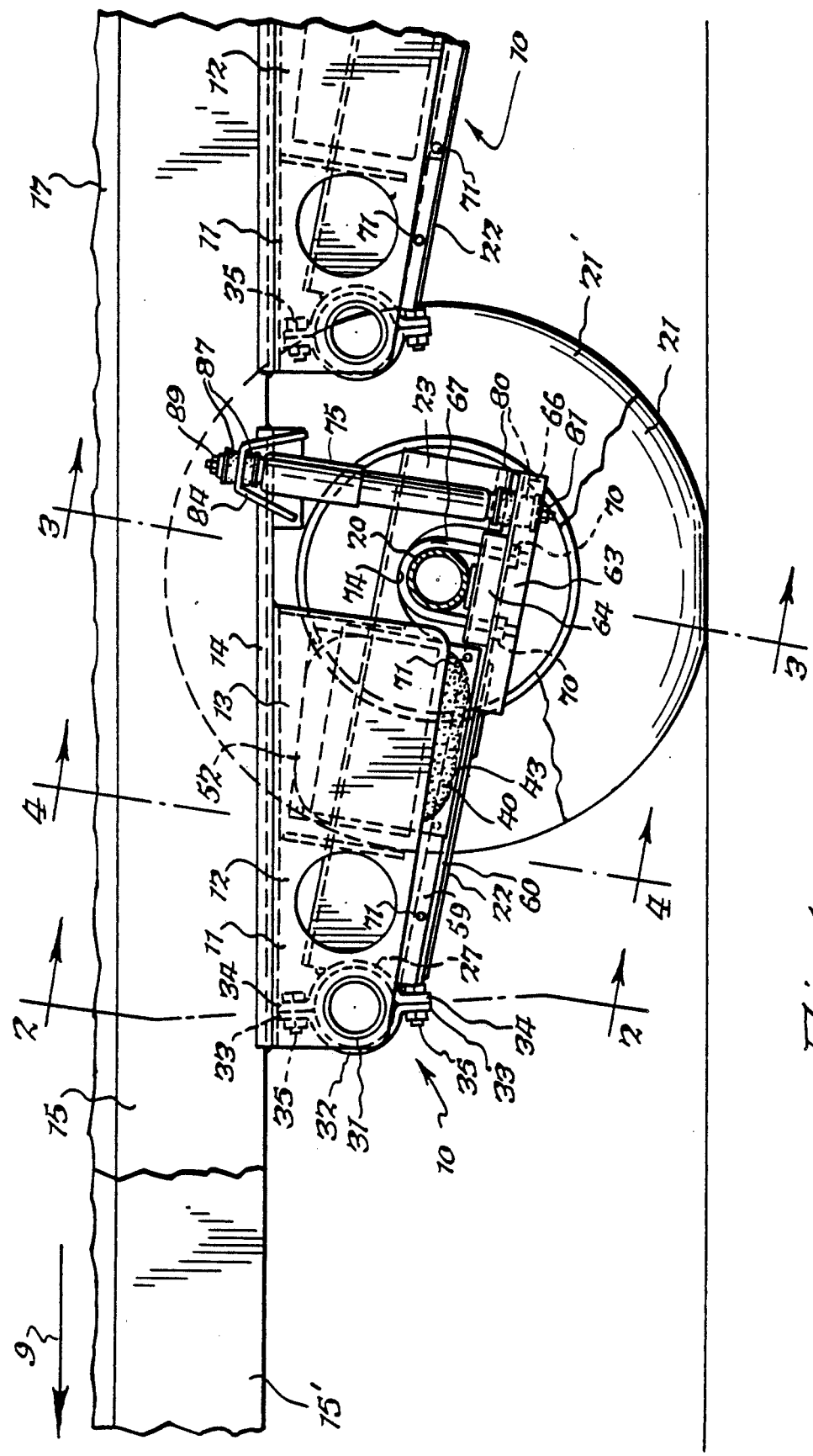
FIG. 1 is a fragmentary cross sectional view taken substantially along line 1—1 of FIG. 3 and showing a plurality of trailing arm modular axle suspension units mounted on the near side of the frame of a towable vehicle.

By way of introduction, one or more pairs of the trailing arm modular axle suspension units 10 may be mounted on the frame of a towable vehicle, with each pair supporting opposite ends of an axle. Thus, a towable vehicle, such as a trailer, may have two, four, six, or any number of trailing arm modular suspension units 10 mounted thereon, depending on its size. Also, if the towable vehicle utilizes only a single centrally located wheel structure, only a single trailing arm modular axle suspension unit can be used. In the following portion of the specification the forward motion of the vehicle on which axle suspension units 10 are mounted is designated by arrow 9, and thus the left end of the complete unit 10 in FIG. 1 is its fore portion and the right end is considered its aft portion.

Each trailing arm modular axle suspension unit 10 includes an inverted U-shaped hanger 11 in the form of a channel having opposite sides 12 extending downwardly from base 13 which has an angle member 14 welded thereto which, in turn, is intended to be welded to a frame member, such as 15, which is a part of vehicle body 17. The vehicle frame member 15 on the near side of the vehicle in FIG. 1 is shown in FIG. 3, and a corresponding frame member on the far side of the vehicle in FIG. 1 is shown in FIG. 2 and designated as 15'. It is also to be noted that the angle member of FIG. 2, which corresponds to angle member 14 of FIG. 3, is the mirror image of the latter and is designated as 14'. In the following portions of the specification, common portions of each trailing arm modular axle suspension unit 10 will be designated with unprimed numerals, and mirror image parts on the far side of the vehicle in FIG. 1 will be designated with primed numerals corresponding to the unprimed numerals of the unit 10 on the near side of the vehicle in FIG. 1. A gusset 19 is welded between sides 12 and base 13 (FIG. 5). Units 10 on opposite sides of the vehicle support opposite ends of axle 20 which mounts wheels 21 and 21' on opposite ends thereof.

A tubular trailing arm 22 includes an inverted U-shaped beam 23 in the form of an inverted channel having opposed sides 24 depending downwardly from bend 25. A first clamp member 27 is welded to the fore end 29 of beam 23. A rubber bushing 30 encircles shaft or axle 31 welded between sides 12 of hanger 13, and clamp member 32 has flanges 33 at the ends thereof which are mated with flanges 34 of clamp member 27 by bolts 35 which extend through bores 37 and 39 in clamp members 32 and 27, respectively. The foregoing connection, which includes the rubber bushing 30, requires no lubrication.

The trailing arm beam 23 is also connected to sides 12 of hanger 11 by rubber springs 40 and 41 which are mirror images of each other. More specifically, springs 40 and 41 have metal plates 42 and 43, respectively, secured to their inner portions in the conventional manner. The upper edge 44 of plate 42 is located under return bend 45 of plate 47 which is welded to one side 24 of beam 23. The upper edge 49 of spring plate 43 lies under return bend 50 of plate 46 which is welded to the other side 24 of arm portion 23. Springs 40 and 41 also have metal plates 51 and 52, respectively, secured to their outer sides in the conventional manner. Plate 51 has four holes 53 therein, and plate 52 has four holes 54 therein. Bolts 55 (FIG. 4) extend through holes 53 and corresponding holes (not numbered) in one side 12 of hanger 13 to secure plate 51 to that side 12. Bolts 57 extend through holes 54 in plate 52 and aligned holes in the other side 12 of the hanger to secure plate 52 to that side 12.

The remainder of the trailing arm modular axle suspension unit includes a trailing arm portion 59 in the nature of an elongated rod which is essentially a tubular member having spaced legs 60 (FIG. 4) connected by a return bend or base 61. A plate 62 is welded across the lower ends of legs 60 (FIG. 4). A U-bolt mounting bracket 63, in the nature of an inverted channel, is welded to the ends of legs 60. A plurality of ribs 66 are welded to channel 63 to rigidize it (FIG. 5), and an axle mounting member or pad 64 in the nature of an inverted U-shaped channel is welded to the return bend 61 of member 60 and to member 63. A pin 65 extends upwardly from member 64 for being received in a mating aperture in axle 20 to thereby locate the latter. U-bolts 67 fit around axle 20, and the ends of U-bolts 67 extend through holes 69 in bracket 63 and are secured by nuts 70.

After the opposite ends of axle 20 have been assembled with trailing arm portion 59, the latter is secured to trailing arm portion 23 by bolts 71 which extend through aligned holes 72 in trailing arm portion 59 and apertures 73 in the opposite sides 24 and plates 46 and 47. Thus the assembled parts 23 and 59 comprise the tubular trailing arm 22. Cutouts 74 in sides 24 of trailing arm portion 23 receive the axle. The cutouts 74 permit the axle 20 to ride relatively close to frame members 15—15', which essentially permits the latter to be spaced relatively close to the ground.

A shock absorber 75 has its lower end 77 extending through hole 79 in U-bolt bracket 63. Rubber grommets 80 are located on opposite sides of member 63, and a nut 81 secures the lower end of shock absorber 75 in position. The upper end 82 of shock absorber 75 extends through hole 83 in bracket 84 which has its leg 85 welded to hanger 11. Grommets 87 are located on opposite sides of bracket 84, and the upper end of shock absorber 75 is secured to bracket 84 by nut 89.

The forward direction of the motion of vehicle 17 is depicted by arrow 9 in FIG. 1. Thus, arms 22 are trailing in the sense that they pivot about shaft 31 which is located at the fore portion of the trailing arm modular axle suspension unit. The wheel axle 20 is mounted at the aft portion of trailing arm 22 which extends beyond the central portion of the hanger 11. The central portions of hanger 11 and trailing arm 22 are secured to each other by rubber springs 40 and 41. Thus, relatively great amounts of up and down movement of wheels 21 and 21' are obtained with relatively small stretchings of springs 40 and 41 because of the centrally mounted locations of the latter.

The rubber springs which are utilized are friction-free, require no lubrication, and provide superior vibration damping characteristics. The rubber springs are also loaded in shear which provides a linear spring rate. Furthermore, the use of rubber springs 40 and 41 between opposite sides of pivotal trailing arm 22 and the opposite sides of the hanger 11 resists lateral movement of the trailing arm, without the use of control arms or trac bars, and further, the pivotal mounting about shaft 31 resists longitudinal movement. Thus, arms 22 operate in strictly a pivotal motion about the axes of shafts 31 and such pivotal motion is confined to a vertical plane.

While a preferred embodiment of the present invention has been disclosed, it will be appreciated that it is not limited thereto but may be otherwise embodied within the scope of the following claims.

What is claimed is:

1. A trailing arm modular axle suspension unit comprising a hanger for attachment to a vehicle frame, fore and aft and central portions on said hanger, a trailing arm, fore and aft and central portions on said trailing arm, means for pivotally mounting said fore portion of said trailing arm on said fore portion of said hanger, means for mounting an axle on said aft portion of said trailing arm, shock absorber means between said aft portion of said trailing arm and said aft portion of said hanger, and spring means between said central portion of said hanger and said central portion of said trailing arm, said hanger including spaced sides, and said central portion of said trailing arm being located between said spaced sides, and said trailing arm including opposite sides, and said spring means comprising rubber springs positioned between said opposite sides of said trailing arm and said spaced sides of said hanger.

2. A trailing arm modular axle suspension unit as set forth in claim 1 wherein said means for pivotally mounting said fore portion of said trailing arm on said fore portion of said hanger member comprises a shaft on said hanger member, a rubber bushing mounted on said shaft, and clamp means secured to said trailing arm and mounted on said rubber bushing.

3. A trailing arm modular axle suspension unit as set forth in claim 2 wherein said trailing arm comprises an inverted elongated channel-like member having an open end at its lowermost portion between said opposite sides, and an elongated rod-like member located at said open end and secured to said opposite sides.

4. A trailing arm modular axle suspension unit as set forth in claim 3 wherein said aft portion of said trailing arm extends outwardly beyond said central portion of said hanger, and wherein said means for mounting an axle are located on said aft portion of said trailing arm which extends outwardly beyond said central portion of said hanger.

5. A trailing arm modular axle suspension unit as set forth in claim 4 including a cutout in said aft portion of said trailing arm for receiving said axle, and wherein said means for mounting an axle on said aft portion of said trailing arm comprises means on said trailing arm extending across said cutout for fastening said axle thereto and retaining said axle within said cutout.

6. A trailing arm modular axle suspension unit as set forth in claim 5 wherein said means on said trailing arm extending across said cutout comprise a bracket, and means on said bracket for receiving U-bolt means.

7. A trailing arm modular axle suspension unit as set forth in claim 6 wherein said U-bolt means comprise a pair of U-bolts, with each U-bolt being located on an opposite side of said trailing arm.

8. A trailing arm modular axle suspension unit as set forth in claim 5 wherein said shock absorber is mounted aft beyond said means for fastening said axle to said trailing arm.

9. A trailing arm modular axle suspension unit as set forth in claim 3 wherein said axle is mounted on said rod-like member.

10. A trailing arm modular axle suspension unit as set forth in claim 1 including a cutout in said aft portion of said trailing arm for receiving said axle, and wherein said means for mounting an axle on said aft portion of said trailing arm comprise means on said trailing arm extending across said cutout for fastening said axle thereto and retaining said axle within said cutout.

11. A trailing arm modular axle suspension unit comprising a hanger for attachment to a vehicle frame, fore and aft and central portions on said hanger, a trailing arm, fore and aft and central portions on said trailing arm, means for pivotally mounting said fore portion of said trailing arm on said fore portion of said hanger, means for mounting an axle on said aft portion of said trailing arm, shock absorber means between said after portion of said trailing arm and said aft portion of said hanger, and spring means between said central portion of said hanger and said central portion of said trailing arm, said trailing arm comprising an inverted elongated channel-like member having an open end at its lowermost portion between said opposite sides, and an elongated rod-like member located at said open end and secured to said opposite sides.

12. A trailing arm modular axle suspension unit as set forth in claim 11 wherein said means for pivotally mounting said fore portion of said trailing arm on said fore portion of said hanger member comprises a shaft on said hanger member, a rubber bushing mounted on said shaft, and clamp means secured to said trailing arm and mounted on said rubber bushing.

13. A trailing arm modular axle suspension unit as set forth in claim 11 including a cutout in said aft portion of said trailing arm for receiving said axle, and wherein said means for mounting an axle on said aft portion of said trailing arm comprises means on said trailing arm extending across said cutout for being fastened to said axle and retaining said axle within said cutout.

14. A trailing arm modular axle suspension unit as set forth in claim 13 wherein said rod-like member extends across said cutout, and wherein said means on said trailing arm extending across said cutout includes said rod-like member.

15. A trailing arm modular axle suspension unit as set forth in claim 14 wherein said means on said trailing arm comprises pad means located in contiguous relationship to said rod-like member.

16. A trailing arm modular axle suspension unit as set forth in claim 15 wherein said pad means comprises an inverted U-shaped channel.

17. A trailing arm modular axle suspension unit comprising a hanger for attachment to a vehicle frame, fore and aft and central portions on said hanger, a trailing arm, fore and aft and central portions on said trailing arm, means for pivotally mounting said fore portion of said trailing arm on said fore portion of said hanger, means for mounting an axle on said aft portion of said trailing arm, shock absorber means between said aft portion of said trailing arm and said aft portion of said hanger, and spring means between said central portion of said hanger and said central portion of said trailing arm, said hanger including spaced sides, and said central portion of said trailing arm being located between said spaced sides, and said trailing arm including opposite sides, and said spring means comprising rubber springs positioned between said opposite sides of said trailing arm and said spaced sides of said hanger, a cutout in said aft portion of said trailing arm for receiving said axle, and wherein said means for mounting an axle on said aft portion of said trailing arm comprises means on said trailing arm extending across said cutout for fastening said axle thereto and retaining said axle within said cutout.

18. A trailing arm modular axle suspension unit as set forth in claim 17 wherein said means for pivotally mounting said fore portion of said trailing arm on said fore portion of said hanger member comprises a shaft on said hanger member, a rubber bushing mounted on said shaft, and clamp means secured to said trailing arm and mounted on said rubber bushing.

19. A trailing arm modular axle suspension unit comprising a hanger for attachment to a vehicle frame, spaced hanger sides on said hanger, fore and aft and central portions on said hanger, a tubular trailing arm, spaced arm sides on said trailing arm, an opening between the lower ends of said arm sides, fore and aft and central portions on said trailing arm, a rubber spring positioned between each of said arm sides and each of said hanger sides at said central portions of said hanger sides and said arm sides, a shaft on said fore portion of said hanger, a rubber bushing on said shaft, clamp means clamping said fore portion of said trailing arm on said shaft, said aft portion of said trailing arm extending beyond said central portion of said hanger, cutout means in said aft portion of said trailing arm, a rod-like member secured across said arm sides at said opening between said lower ends and extending across said cutout means, axle mounting means on said rod-like member below said cutout means, shock absorber mounting means between said aft portions of said trailing arm and said hanger, and a shock absorber fastened on said shock absorber mounting means.

* * * * *

UNITED STATES PATENT AND TRADEMARK OFFICE
CERTIFICATE OF CORRECTION

PATENT NO. : 4,995,636

DATED : February 26, 1991

INVENTOR(S) : Ron E. Hall et al

It is certified that error appears in the above-identified patent and that said Letters Patent is hereby corrected as shown below:

Column 1, line 17, after "can" insert --mount--.

Column 5, line 15 (claim 11), change "after" to --aft--.

Signed and Sealed this

Thirtieth Day of June, 1992

Attest:

DOUGLAS B. COMER

*Attesting Officer*    Acting Commissioner of Patents and Trademarks